June 28, 1960 C. R. VAN WYNGARDEN 2,943,137
INSERT FIXTURE HANGER AND CLOSURE PLATE
Filed Oct. 24, 1952 2 Sheets-Sheet 1
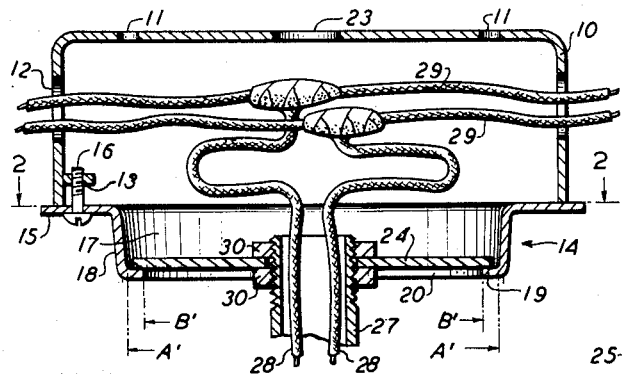
C. R. VAN WYNGARDEN
INVENTOR
ATTORNEY June 28, 1960 C. R. VAN WYNGARDEN 2,943,137
INSERT FIXTURE HANGER AND CLOSURE PLATE
Filed Oct. 24, 1952 2 Sheets-Sheet 2

C.R. VAN WYNGARDEN
INVENTOR

ATTORNEY

United States Patent Office 2,943,137
Patented June 28, 1960

2,943,137

INSERT FIXTURE HANGER AND CLOSURE PLATE

Clarence R. Van Wyngarden, Riverside, Calif., assignor of one-half to Jess M. Roberts Filed Oct. 24, 1952, Ser. No. 316,616

4 Claims. (Cl. 174—61)

This invention relates to an attachment for electrical outlet boxes and specifically to means for suspending fixtures and lighting appliances from outlet boxes placed in the ceiling of a room.

A purpose of the invention is to provide a fixture suspending means of extreme simplicity and low cost.

A purpose of the invention is to provide a fixture suspending means by the use of which the fixture may be suspended from the box without rotating the fixture and without twisting the wires leading thereto.

A purpose of the invention is to provide a suspension means so arranged that the fixture may depend from any position within the outlet box opening and may be shifted laterally to compensate an error in the original positioning of the box.

A purpose of the invention is to provide a suspension means which may be sealed to the fixture ring to render the box vapor-proof and water-tight.

A purpose of the invention is to provide a suspension means which is held in position by the weight of the fixture attached to it and which cannot be dislodged without intentionally lifting and moving it from its position of rest.

A purpose of the invention is to provide a suspension means which may be adapted to use with an outlet box located in a vertical wall.

A purpose of the invention is to provide a suspension means in the form of a plate which, when placed at the upper end of a fixture stem, may be inserted in the box by simple movements of the hands and which, when in position, will support the weight of even the heaviest lighting fixture while the electrical connections are being made.

These and other objects and advantages of the invention will become evident on inspection of the attached drawings and the following description thereof, in which Fig. 1 is a cross-section through a typical electrical outlet box, taken on the broken line 1—1 of Fig. 2, showing the hanger plate in supporting position and a fragment of a fixture-supporting stem attached to the plate;

Fig. 2 is an inside plan view of the outlet box fixture ring, as on the line 2—2 of Fig. 1;

Fig. 3 is a cross-section through the fixture ring, as on the line 3—3 of Fig. 2, showing the insert hanger plate in position within the ring and resting on inwardly directed projections from the lower edge of a central opening therein;

Fig. 4 is a plan view of a simple form of the insert hanger plate, adapted for use in instances where the box is properly positioned in the first instance and the stem does not need to be shifted laterally with relation to the box;

Fig. 5 is a plan view of a modified form of the hanger plate, adapted for use in instances where the box is not properly positioned, this form permitting lateral shifting of the fixture stem to any point within the circumference of the opening through the ring;

Figure 6:
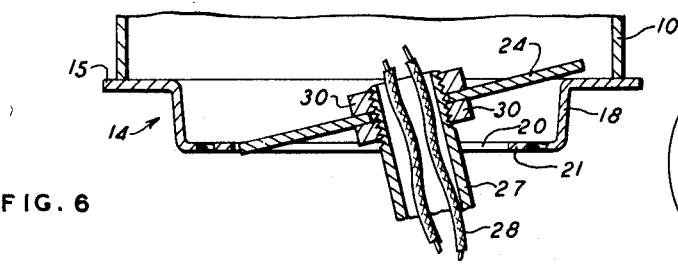
Fig. 6 is a view similar to Fig. 3 illustrating a manner of inserting the hanger plate in the ring which is suitable for use with fixtures of slight weight.

Referring first to Figs. 1 and 2, the conventional outlet box with which the hanger plate of the invention is used has a case 10, usually of pressed steel, with openings 11—11 for screws by which the case is attached to the woodwork of the ceiling or wall, openings 12—12 for the passage of conduit or wires, and lugs 13 for the attachment of the fixture ring generally indicated at 14. The ring has a flat rim 15 which is held against the lower edge of the case by screws 16, and is formed with a circular depression 17 having a vertical or sloping side wall 18, the lower edge of which is turned inwardly to form a narrow annular flange 19 surrounding a central opening 20.

At opposite points this flange is extended to form ears 21—21 which are provided with tapped holes 22—22, and the upper side of the case is provided with an opening 23. These three elements are not utilized in connection with the hanger plate of the invention, but are present in the outlet boxes of commerce. These conventional outlet boxes are sold in a wide variety of sizes and of forms; e.g., the case 10 may be square or octagonal and the ring 14 may be square or circular in outline, but the diameter of opening 20 is the same in all sizes and forms, and the width of flange 19 substantially the same in all, thus permitting one size of hanger plate to be used in all boxes of this type, regardless of size.

The simplest form of the insert hanger plate which is the principal subject of the invention is shown at 24, in section in Figs. 1 and 3 and in plan in Fig. 4. This plate is a disk, punched or otherwise formed from relatively rigid sheet material, usually sheet steel though plates of fibre or of synthetic resins may be used. Steel of #14 gauge is sufficiently stiff for supporting fixtures of moderate weight. On opposed sides of the disk small segments are trimmed away, as at 25—25, to permit the plate to pass at an angle through the opening 20 bounded by the inner margin of flange 19. The plate has a central opening 26 of such diameter as to pass the threaded end of the fixture stem 27, a section of pipe or tubing to the lower end of which the lighting fixture, not shown, is attached. The fixture leads 28—28 pass through the stem to the outlet box, in which they are connected with the main leads 29—29 in the usual manner. The threaded upper end of the stem is preferably fixed in the plate by two lock nuts 30—30, or the opening 26 may be threaded and a single lock nut placed below the plate. To avoid the necessity for providing plates otherwise identical but having openings 26 of different sizes to fit stems of varied diameter, this opening may be made of such size as to pass the largest stem likely to be used, smaller stems being centered in this opening by the use of simple bushings.

The relations of the dimensions of the insert plate to corresponding dimensions of the ring are critical. Thus, the diameter A—A of the plate must be very slightly less than the diameter A'—A' at the lower inner corner of depression 17, in order that the plate may bear on the upper surface of the flange and also be restrained from lateral shift. The dimension B—B perpendicular to the straight sides must be less than diameter B'—B' inside the flange 19 but preferably only slightly less, it being desirable to cover the opening through the ring as completely as possible.

It is desirable, though not always essential, to provide the plate with tapped holes 31—31 and the insertion of machine screws with wide heads as at 32 in Fig. 5. It will be seen in Figs. 1 and 3 that the plate, once in position on the flange, is held down firmly by the weight of the lighting fixture and does not need to be locked down. These screws will be required, however, if the fixture is to be grounded to the outlet box, or if the box is placed in a vertical wall, and in most instances these screws are desirable if a sealing gasket or its equivalent is used as in Fig. 8.

The modified form of hanger plate 24' illustrated in Fig. 5 is used when it is necessary to shift the position of the fixture stem with relation to the position of the outlet box, to avoid the necessity for shifting the case when a minor error in location has been made.

In this form the central opening 26 of the plate of Fig. 4 is replaced by a slot 33 of such width as to receive the fixture stem 27. By rotating the plate on flange 19 and moving the stem along the length of the slot, the axis of the stem may be placed in any position within a circle having from one-half to three-quarters the diameter of the plate, varying with the diameter of the stem itself. When properly positioned with relation to ceiling markings or other reference lines, the stem is locked in the slot by tightening lock nuts 30 and the plate is locked against rotation by one or more screws 32 inserted from below and having heads wide enough to engage the lower face of flange 19, as at 34 in Fig. 8.

One manner of inserting the hanger plate in the fixture ring is illustrated in Fig. 6. The fixture (not shown) is mounted on the lower end of stem 27 and the fixture leads 28—28 are brought out of its upper end. The hanger plate 24 (or 24') is mounted on the upper end of the stem and the locknuts 30—30 are made up tightly, after which the fixture leads are electrically connected with the main leads 29—29 (Fig. 1).

The stem is then grasped in both hands, tilted, and rotated until the narrower dimension B—B of the plate will pass through opening 20, the movement being upwardly and to the right. When the trailing edge of the plate clears the left hand lug 21 the stem is brought to the vertical position, moved to the left, and lowered into its position of rest on the lugs and flange. Any locking or grounding screws required are then inserted from below, after the fixture is positioned and its weight carried by the ring.

Figure 7:
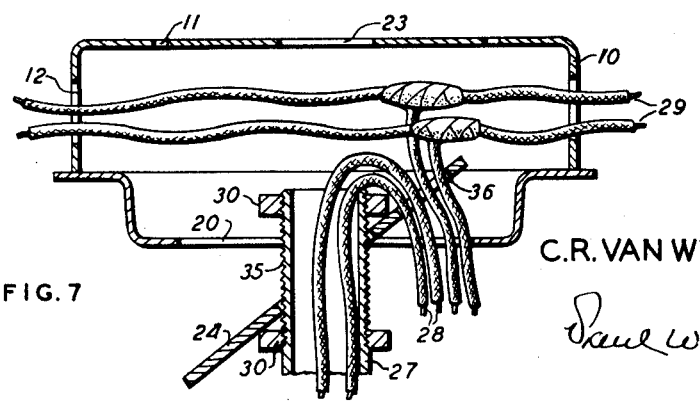
Fig. 7 is a similar cross-section, illustrating another manner of inserting the plate in the ring, this procedure being more desirable where the fixture is heavy.

If the lighting fixture is too heavy to handle in the above manner it will be found more convenient to use the method of insertion illustrated in Fig. 7. For this purpose a long thread 35 is formed on the upper end of stem 27, permitting plate 24 to be tilted by pressing down on one edge while the stem is vertical. When the lugs are cleared as above described the stem is lowered until the plate rests on the lugs and flange and the upper lock nut rests on the plate, after which the lower lock nut is run up to position and tightened. To permit tilting of the plate with regard to the stem, central opening 26 must be enlarged, or preferably, somewhat elongated in the dimension A—A of the plate, as at 26' in Fig. 4.

As above described, it would be necessary to support the fixture and stem in such manner as to bring the upper end of the stem close to the ring while the leads are being connected, as the amount of slack wire which can be crowded into the outlet box is limited. To avoid this inconvenience I prefer to provide plate 24 with an eccentrically disposed opening or knock-out 36 through which the ends of fixture leads 28 and of branches from main leads 29 may be passed before the plate is finally positioned in the ring (see Fig. 7). After the plate is positioned and the weight of the fixture supported from the ring, the wire ends are suitably connected and insulated and are then tucked back into the box, after which the opening 36 may be sealed with a conventional knock-out closure.

Figure 8:
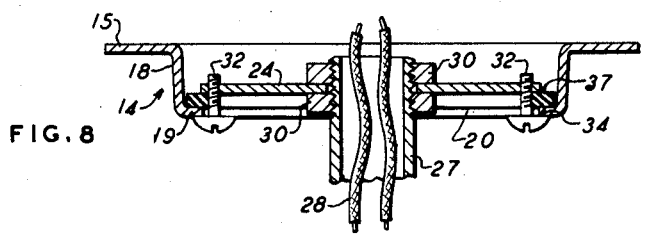
Fig. 8 is a cross-section through the fixture ring, as on the line 6—6 of Fig. 2, illustrating the use of a gasket for sealing the outlet box.

In cases where the outlet box is placed in an exposed position it may be desirable to seal the plate against the flange to exclude moisture or vapors. As shown in Fig. 8, a soft gasket 37 of rubber or other resilient material or a ring of a self-hardening mastic may be used for this purpose, preferably a ring which projects inwardly for a short distance from the inner edge of the flange so as to contact the straight sides of the plate. This gasket is placed between the plate and the flange at any convenient time before lowering the plate into its final position, and is finally compressed by tightening screws 32 having heads wide enough to engage the lower face of flange 19.

Figure 9:
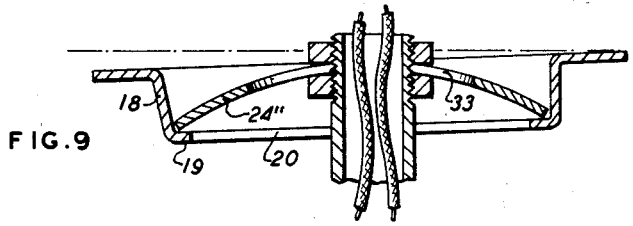
Fig. 9 is a cross-section through the fixture ring, as on the line 6—6 of Fig. 2, illustrating the use of a dished hanger plate for aligning a fixture stem which would not be vertical if suspended from a flat plate.

For some purposes, as where it is desirable to allow a small portion of the fixture stem to project into the outlet box, use may be made of the dished plate 24" shown in section in Fig. 9. This plate may have a central opening for the stem, as at 26 in Fig. 4, or a slot 33 as in Fig. 5. In the use of the slotted dished plate it is often possible to correct a small deviation of the stem from the vertical by first rotating the plate until the slot is aligned with the direction of maximum slope of the case and ring and then moving the stem along the length of the slot until it assumes the vertical position. If this shifting of the stem throws it too far off center as regards opening 20, recourse may be had to the conventional universal (ball-and-socket) joint used with the flat plate of Fig. 4 or Fig. 5.

Figure 11:
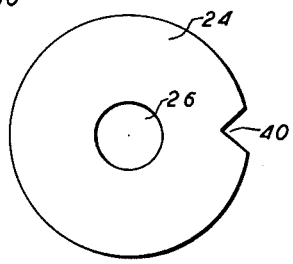
Fig. 11 is a plan view of a plate having a single peripheral indentation, which may be substituted for the plate of Fig. 4.

In the modified form of plate illustrated in Fig. 11, the cutting away of opposed sides to form parallel straight faces as at 25—25 in Figs. 4 and 5 is avoided by providing the plate 24 with a single peripheral indentation 40, which may be of any preferred V-, arcuate or rectangular contour. The dimension B—B of the plate so formed must be less than the diameter B'—B' inside flange 19. This form of plate is inserted in the ring by placing the indentation over the flange and rotating the plate around the indentation until the opposite point of the edge of the plate has cleared the flange. The plate is then levelled and brought down onto the flange with the indentation partly or entirely closed by being brought over one of the ears 21.

Figure 12:
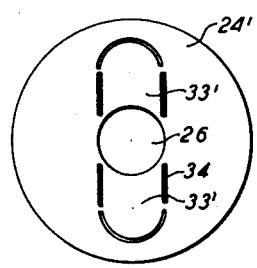
Fig. 12 is a plan view of a form of plate in which the functions of the plates of Fig. 4 and Fig. 5 are combined by the provisions of knock-outs which permit the central opening to be converted to a slot.

The form of hanger plate illustrated in Fig. 12 may be used in lieu of either of the plates of Figs. 4 and 5. In this form the central opening 26 of Fig. 4 is cleared in punching the plate from sheet stock, but the extensions 33'—33' are left filled with metal, being slitted or partially punched through as at 34—34, forming knock-outs which may readily be removed by the user of the plate.

Figure 10:
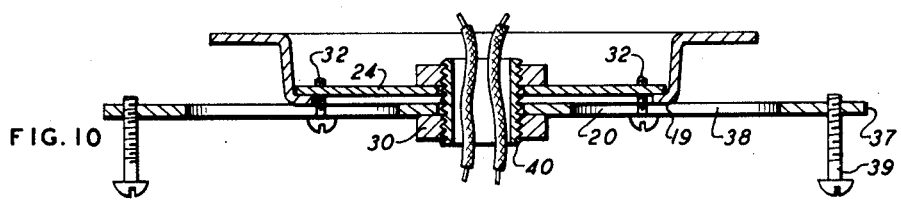
Fig. 10 is a cross-section through the fixture ring, as on the line 6—6 of Fig. 2, illustrating the use of the hanger plate in combination with the conventional fixture bar for fixtures not adapted to be supported by a stem or chain.

The above described insert hanger plates are adapted for use with any of the conventional fittings at present used with outlet boxes of the type described. An example is illustrated in Fig. 10, in which a fixture bar 37 is shown in section, this bar having longitudinal slots 38—38 and screws 39—39 for the attachment of fixtures which are not adapted to be mounted on a stem. A short threaded nipple 40 passes through openings in the bar and in plate 24 and lock nuts 30—30 clamp the plate to the upper side and the bar to the lower side of flange 19. If additional stiffness of bar is required, screws 32—32 may be inserted as shown.

The use of the devices above described is attended by material advantages in convenience, in facilitating the assembly of fixture with outlet box, in saving of electrician's time and in permitting almost any assembly to be made by a single workman. These advantages become particularly evident in comparison with the generally accepted and most commonly used mounting in which the upper end of the fixture stem is screwed into a fixture stud at the upper side of the case, the fixture leads passing out through openings near the upper end of the stem or in an extension interposed between the stem and the stud.

In this common method of mounting the stem, with the fixture attached to its lower end, is rotated through many revolutions before the threads become tight. While so rotating, the leads wrap around the stem and around each other, and great care is required to keep the wires separated and to avoid damage to insulation.

Again, if the fixture is heavy, or when working on high ladders, or if one of threads is slightly battered, it is often very difficult to effect the first engagement of the threads and much time may be lost. It is almost impossible to mount any but the lightest fixtures in this manner without using two workmen.

These difficulties are wholly avoided in the use of the described insert hanger plate, which is placed on the stem before the fixture is lifted from the floor and which is finally positioned without rotating through more than a quarter turn in any case. With this device, a single workman can mount, unaided, any fixture which he can lift.

Again, in the commonly used method of mounting, if the outlet box be slightly out of level, or if any of the threads are slightly out of line, the stem will not be vertical and it will be necessary to dismount the fixture and insert a universal joint of some kind between the stem and the stud. This difficulty is avoided in the use of the dished hanger plate of Fig. 9 or, if the error is noted only after a flat plate has been used, the stem may readily be brought to the vertical position by inserting a shim beneath the low edge of the plate.

Further, in the use of the screwed mounting the lateral position of the stem is fixed with relation to the position of the box, and where the stem must be centered on a ceiling block or at an intersection of blocks or lines, the box must be shifted to correct the error. In the use of the slotted plate of Fig. 5, even a large error in the original position of the box may be compensated without moving it.

These advantages of the disclosed device, which result in material savings of operator's time and labor cost, are coupled with the further advantages of complete closure of the fixture ring by the inserted plate, and the ability to effect vapor tight closure of the box if desired. These are important benefits, and are attained without increase in material cost over that incurred in the use of the cheapest mounting of the prior art.

A further advantage of the invention relates to earthquakes. It has been found that fixture studs, extension nipples, and the like provide rigid connection between the fixture stem and the building structure and therefore are inadequate to withstand the shock and stress caused by sudden and severe tremors. Screws holding a fixture stud are relatively close together so that tremors tending to swing a fixture at the end of a relatively long fixture stem exert tremendous leverage against the screws and consequently a fixture of substantial weight will cause the fixture stem to break loose and drop the fixture. The present invention permits the fixture to hang in a manner providing full freedom for the fixture stem to swing in any direction without the creation of destructive stress. Even if screws are used to hold down the hanger plate as shown in Fig. 5 and Fig. 8, the stripping of the threads of such screws by reason of earth tremors will not cause the fixture to drop.

I claim as my invention:

1. In an electrical outlet assembly including an outlet box and a fixture ring attached thereto having a downward generally cylindrical offset of less diameter than the width of the outlet box and terminating in a generally circular inwardly turned flange having two diametrically opposite radially inward ear extensions, the combination therewith of: an insert hanger member to support a fixture stem, said member having the configuration in plan of a disk of nearly the inside diameter of said cylindrical offset with at least one marginal portion of the disk cut away to provide a diametrical dimension to permit insertion of the hanger member into said ring for support by said ring flange, the dimensions of said cut away marginal portion within the circle defined by said ring flange being less than the dimensions of said ear extensions whereby the inserted hanger member may be rotated to a position to co-operate with at least one of said ear extensions to completely close the fixture ring opening.

2. An insert hanger member as set forth in claim 1 which has two diametrically opposite cut away portions dimensioned to be masked respectively by said two ear extensions of the fixture ring.

3. An insert hanger member as set forth in claim 1 having tapped holes near its edges for the reception of screws, said holes being positioned for engagement of the heads of the screws with the under surface of said ring flange to immobilize the hanger member relative to the fixture ring.

4. A combination as set forth in claim 1 which includes sealing means interposed between the under surface of said hanger member and the upper surface of said ring flange; and which includes means including screws threaded into said hanger member and providing engagement with the under surface of said ring flange to exert clamping pressure on said sealing means and to immobilize the hanger member relative to the fixture ring.

References Cited in the file of this patent

UNITED STATES PATENTS

| | | |
|---|---|---|
| 1,035,782 | Fowler | Aug. 13, 1912 |
| 1,197,052 | Newhall | Sept. 5, 1916 |
| 1,265,064 | Donley | May 7, 1918 |
| 1,440,137 | Dengler | Dec. 26, 1922 |
| 1,449,729 | Cain | Mar. 27, 1923 |
| 1,839,250 | Newman | Jan. 5, 1932 |
| 1,843,201 | Buchanan | Feb. 2, 1932 |
| 1,935,565 | Goetzelman | Nov. 14, 1933 |
| 2,214,382 | Rastetter | Sept. 10, 1940 |
| 2,321,640 | Adkins | June 15, 1943 |
| 2,456,450 | Sauter | Dec. 14, 1948 |

FOREIGN PATENTS

| | | |
|---|---|---|
| 182,097 | Great Britain | Aug. 2, 1923 |